(12) United States Patent
Bates

(10) Patent No.: US 7,798,544 B1
(45) Date of Patent: Sep. 21, 2010

(54) DOOR AND GATE LATCH WITH HORSESHOE HANDLE

(75) Inventor: Elwood Bates, 49343 Elk View Rd., Chilliwack, British Columbia (CA) V4Z-1E8

(73) Assignee: Elwood Bates, Chilliwack, B.C. (CA)

( * ) Notice: Subject to any disclaimer, the term of this patent is extended or adjusted under 35 U.S.C. 154(b) by 0 days.

(21) Appl. No.: 11/529,718

(22) Filed: Sep. 27, 2006

(51) Int. Cl.
*E05B 15/02* (2006.01)
*E05C 1/06* (2006.01)

(52) U.S. Cl. .................. 292/340; 292/57; 292/137; 292/146; 292/150; 292/DIG. 29

(58) Field of Classification Search ............... 292/340, 292/57, 63, 64, 66, 137, 145, 146, 150, DIG. 29
See application file for complete search history.

(56) References Cited

U.S. PATENT DOCUMENTS

| | | | | |
|---|---|---|---|---|
| 177,674 A | * | 5/1876 | Adams | 292/57 |
| 276,333 A | * | 4/1883 | Baldwin | 292/238 |
| 777,135 A | * | 12/1904 | Parsons | 292/57 |
| 836,463 A | * | 11/1906 | Rapson | 292/57 |
| 880,214 A | * | 2/1908 | Hennings | 292/264 |
| 912,930 A | * | 2/1909 | Alderman | 292/57 |
| 972,067 A | * | 10/1910 | Dickey | 292/57 |
| 1,194,786 A | * | 8/1916 | Ross | 292/216 |
| 1,262,809 A | * | 4/1918 | Kolody | 292/57 |
| 1,294,462 A | * | 2/1919 | Herlihy | 292/57 |
| 1,325,538 A | * | 12/1919 | Smith | 292/264 |
| 1,654,913 A | * | 1/1928 | Beemer | 292/57 |
| 2,403,065 A | * | 7/1946 | Engert | 292/57 |
| 2,538,398 A | | 1/1951 | Thompson | |
| 2,554,759 A | * | 5/1951 | Vickers | 292/264 |
| 2,631,877 A | * | 3/1953 | Ainsworth | 292/57 |
| 2,746,783 A | | 5/1956 | Rader | |
| 2,259,752 A | | 8/1956 | Deming | |
| 2,805,093 A | * | 9/1957 | Van Den Thoorn | 292/264 |
| 2,816,431 A | * | 12/1957 | Harney | 70/93 |
| 3,381,412 A | | 5/1968 | Brotherson | |
| 3,473,598 A | * | 10/1969 | Leighty et al. | 160/328 |
| 3,561,804 A | * | 2/1971 | Brown | 292/58 |
| 3,720,431 A | | 3/1973 | Oliver et al. | |
| 3,955,837 A | * | 5/1976 | Christensen | 292/173 |
| 4,115,954 A | | 9/1978 | Larkin | |
| 4,226,450 A | | 10/1980 | Kerr | |
| 4,254,975 A | * | 3/1981 | Miller | 292/264 |
| 4,333,673 A | | 6/1982 | Kerr | |
| 4,422,678 A | | 12/1983 | Tucket | |
| 4,437,692 A | * | 3/1984 | Halopoff | 292/57 |
| 4,482,177 A | * | 11/1984 | Nagy | 292/156 |
| 4,648,642 A | * | 3/1987 | Berich | 292/264 |
| 4,655,487 A | * | 4/1987 | Korn et al. | 292/57 |

(Continued)

Primary Examiner—Carlos Lugo

(57) ABSTRACT

A latch assembly for securing a gate or door to a doorframe or post that comprises a keeper and a latch. The latch comprises a base member, first and second extension guides, first and second extension locks, a sliding bolt and a handle member. The handle member has a handle base having a first portion with one side attached to the sliding bolt and a wide tapering portion extending away from the opposite side of the handle base and defining an elongated slot, and a horseshoe shaped grip member having one end attached to the wide tapering portion and an opposite grip portion. The handle base and the wide tapering portion are sized and shaped so as to provide the grip portion closed to the sliding bolt to assure a smooth sliding movement of the sliding bolt.

4 Claims, 5 Drawing Sheets

U.S. PATENT DOCUMENTS

| | | | |
|---|---|---|---|
| 4,870,782 A | 10/1989 | Purves | |
| 4,911,486 A * | 3/1990 | Anderson | 292/148 |
| 5,020,840 A * | 6/1991 | Winter | 292/264 |
| 5,284,370 A | 2/1994 | Dunn | |
| 5,307,653 A * | 5/1994 | Davis | 70/56 |
| 5,427,422 A * | 6/1995 | Madlener et al. | 292/264 |
| 5,511,835 A * | 4/1996 | Hardee | 292/238 |
| 6,209,933 B1 * | 4/2001 | Ang et al. | 292/336.3 |
| 6,364,381 B1 * | 4/2002 | Schmidt et al. | 292/264 |
| 6,422,613 B1 | 7/2002 | Boroviak | |
| 6,929,294 B2 * | 8/2005 | Byrla et al. | 292/336.3 |
| 7,021,678 B1 * | 4/2006 | Raoult | 292/63 |

\* cited by examiner

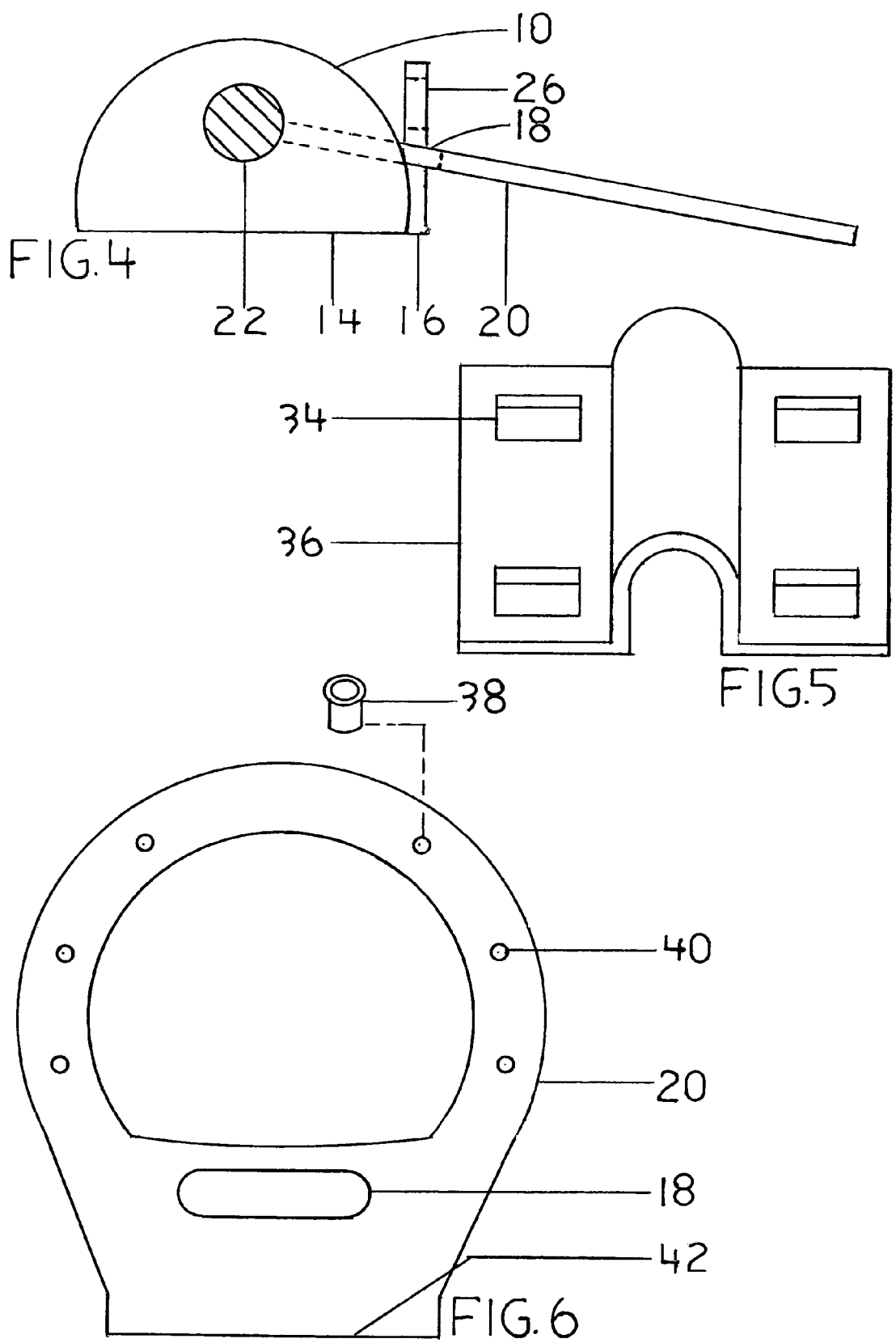

DOOR AND GATE LATCH WITH HORSESHOE HANDLE

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The present invention relates to a door and gate latch, for use on farms, ranches and homes in metropolitan areas.)

2. Prior Art

The present invention relates to an improved door and gate latch for use in and around homes on farms, ranches and metropolitan areas. There is a reassuring need for a simple and dependable door and gate latch, to keep doors and gates closed. In the past, thousands of devices have been introduced for this purpose. However, many of these latches presented structural complexities with resulting maintenance and operational problems. A large number of latches would not provide reliable security when used with large and medium sized animals. Still many other gates could be easily unlatched accidentally by animals, specifically gates featuring operational access from both sides of the gate. Limitation features are a factor in all latches however, failure to consider the fine line between reliable simplicity and complexity where animals are concerned is the reason for the problems I have quoted above.

The use of latches to secure doors and gates in a closed position is well known in the art U.S. Pat. Nos. 3,955,837; 2,759,752; 4,115,954; 4,870,782; 4,422,678; 6,422,613; 4,226,450; 5,284,370; 4,333,673; 3,720,431; 3,381,412; 2,746,783; and 2,538,398 provide a good representative example of the art for door and gate latches. Most of these devices perform at an acceptable level however, there may be a need for a device with a wider range of support flexibility that is easy to operate and is reliable. Most of the latches referred to above and many others I reviewed have in common a structural complexity that introduces operational and maintenance problems. Latches advocating remote electronic control devices that open and close gates without leaving a vehicle are not economically viable for most people. A significant number of latches did not have a reversible flexibility to function on doors and gates that swing to the left or right when being opened. The largest reoccurring problem areas were weak mounting devices and operational problems with enclosed parts. Containers enclosing operational elements and parts create early operational problems from rust, dirt and ice. Enclosed operational parts in container devices further introduce restrictive forces creating operational problems with outside latches in particular. Many latches shown in combination with chains can be relied on for economic or temporary solutions but can be awkward and cumbersome to deal with under the most ideal conditions and most important provide unreliable security with medium and large sized animals. Keepers and latches should provide a means to adjust the alignment between the latch bolt and keeper aperture. Operational parts are often easily and awkwardly exposed to wear and tear from larger animals. Bolts in particular cause problems early on when enclosed in tubular and other devices that rely on springs to provide movement energy. Many latches advocating the use of chains only were simple and economically feasible however, they would be clumsy and awkward to operate. Many people being small, older or physically handicapped would experience difficulty in operating many of these latches. Most latches failed to provide sturdy dependable attachment devices with features that would endure the stress forces imposed by large and medium sized animals. Handles were very vulnerable in a number of applications in that they could be accessed easily when larger agile animals stood on their rear feet studying themselves with front feet on the gates. Many latches introduced attachment devices with complicated means for installation on doors and gates. Other latches I viewed provided a limited range for use on gates produced with variations in construction materials.

OBJECTS AND ADVANTAGES

Accordingly several objects and advantages of the invention are:
(a) to provide a door and gate latch with two interrelated component units providing simple and reliable operational features;
(b) to provide a latch that is easy to fabricate, is simple, sturdy and economical;
(c) to provide a latch with no enclosed functioning elements or parts;
(d) to provide a latch that is one unit without screws, bolts and nuts, or spot welding;
(e) to provide a latch that is reversible and designed for installation on doors and gates that swing to the left or right when opened;
(f) to provide a latch with a mounting device that allows for a solid and secure attachment to a door or gate;
(g) to provide a latch that is easy to attach to a door or gate;
(h) to provide a latch that is reliable, easy to operate and will provide a life time of trouble free performance;
(i) to provide a latch with a uniquely designed horseshoe shaped handle that can be grasped with the whole hand to operate;
(j) to provide a latch with simple and viable methods for fabrication;
(k) to provide a latch that can be affixed to wooden gates, metal frames or pipe gates;
(l) to provide a latch where animals can not physically gain access to a latch and open it;

Other objects and advantages are to provide a door and gate latch that can be installed on conventional or unconventional doors and gates. Another object is to provide a door and gate latch with means to locate the device during the hours of darkness. Another object of the present invention provides an improved latch that can be secured in a latched position with a keeper pin or locked with a padlock. To provide a keeper with adjustment features for realignment with the bolt on the door and gate latch. Another object is to provide a latch with a bolt long enough to allow adjustments to be made if the distance between post and jamb and gate or door increases. Still further objects and advantages will become apparent from considerations of the description and drawings.

SUMMARY

The present invention relates to a wide range of improvements and begins with the present door and gate latch being comprised of two component units. The first component unit having a mounting device or base consisting of four mounting bolt holes and all operational parts cut from flat plat steel forming one piece. The improved horseshoe shaped handle also cut from steel platting is affixed to a elongated bolt wherein comprising the second component unit. However, the handle is affixed to the bolt after the parts of the first component unit are pressed into operational position and the bolt is inserted through the extension guides, then the handle is affixed to the bolt and the door and gate latch is operational. The handle further provides a convenient improvement feature whereby, the latch can be located during the hours of darkness.

BRIEF DESCRIPTION OF THE DRAWINGS

FIG. 4 illustrates the door and gate latch from a perspective end view showing the horseshoe shaped handle down over and engaged with the extension lock in the latched position.

FIG. 5 illustrates a keeper with four square elongated carriage bolt slots providing a means to adjust the alignment between the bolt and keeper.

FIG. 6 illustrates the horseshoe shaped handle with the elongated interlocking slot near the bottom of the handle that provides a means of engagement with the extension locks.

DRAWING REFERENCE—NUMERALS

| 10 | bolt extension guide |
| 12 | bolt extension guide hole |
| 14 | first component unit |
| 16 | extension locks |
| 18 | interlocking slot |
| 20 | horseshoe shaped handle |
| 22 | bolt |
| 24 | keeper pin |
| 26 | keeper pin holes |
| 28 | bolt extension guide bending points |
| 30 | extension lock bending points |

-continued

| 32 | mounting bolt holes |
| 34 | carriage bolt slot |
| 36 | keeper |
| 38 | luminous cups |
| 40 | drilled holes |
| 42 | base of handle |
| 44 | gate frame |
| 46 | gate fence post |
| 48 | matching keeper |
| 50 | mounting bolts |
| 52 | door |
| 54 | building or shed |

DETAILED DESCRIPTION OF PREFERRED EMBODIMENT

Figure 1:
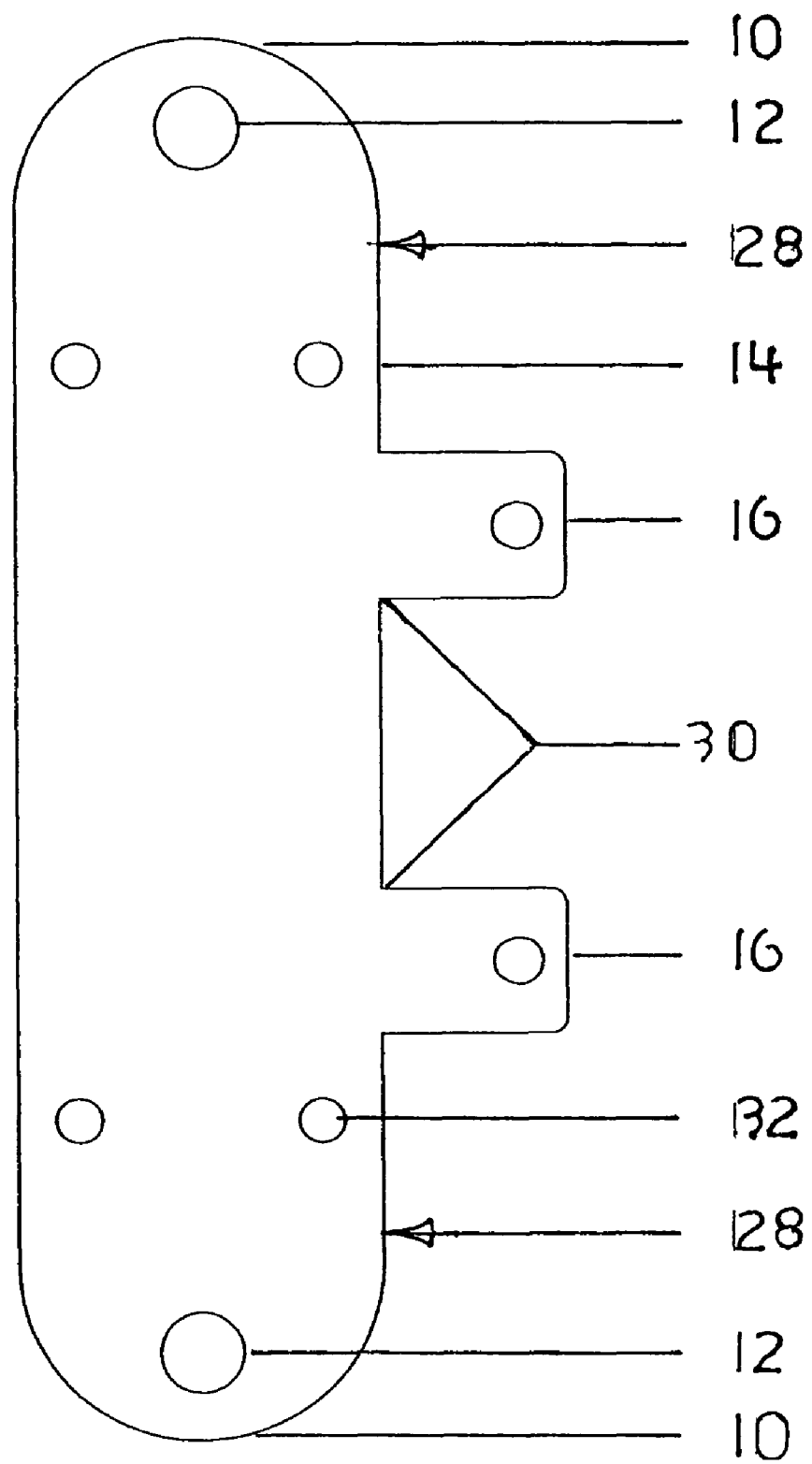
FIG. 1 illustrates the first component unit and all operational parts and cut outs in a flat profile view.
Figure 2:
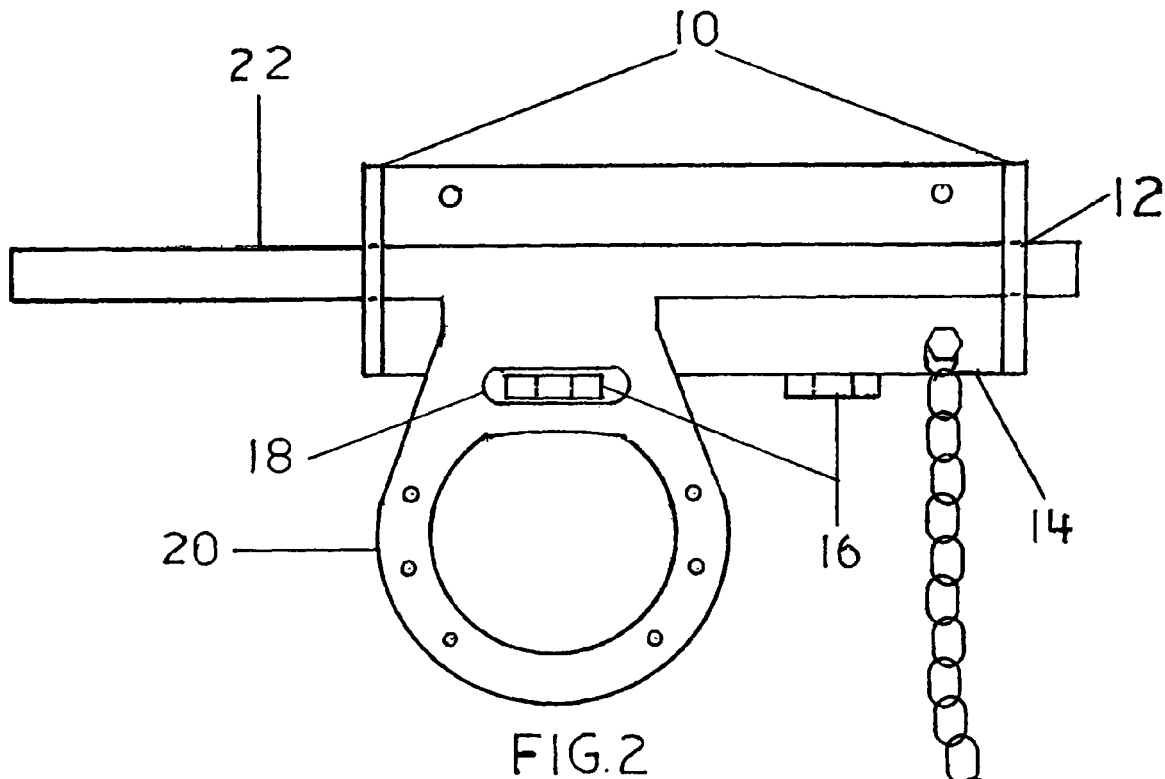
FIG. 2 illustrates a front view of a completed door and gate latch hypothetically mounted on the left side of a door or gate with the handle engaged with the left extension lock in a latched position.
Figure 3:
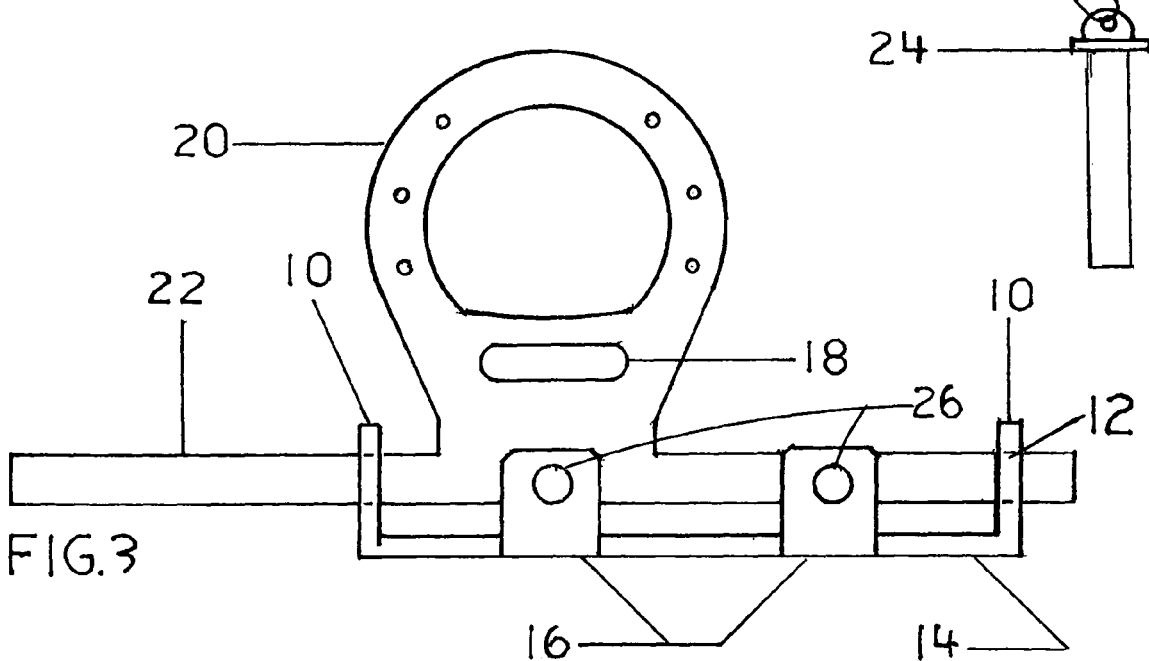
FIG. 3 illustrates a bottom view of the door and gate latch again hypothetically mounted on the left side of a door or gate with the horseshoe shaped handle rotated upward off the extension lock.

Referring now to the drawings. A preferred embodiment comprising the first component unit 14 of the present invention illustrated in FIG. 1 showing a mounting device consisting of four drilled mounting bolt holes 32 in conjunction with the base of the first component unit 14. FIG. 1 further shows a (top) perspective view looking (down) on a flat profile of the first component unit 14 and all integral parts. The first component unit 14 comprising all the working parts is designed into one piece of steel cut from cold rolled steel platting. FIG. 1 further illustrates the improvement provided for a solid attachment of the door and gate latch wherein the wide distribution of the mounting bolt holes 32 increases base area contact. Bolt extension guides 10, one on each end of the first component unit 14 with cut out bolt extension guide holes 12 near the ends. FIG. 1 shows the bolt extension guides 10 in a flat configuration with lead lines and arrows 28 indicating a bending point for pressing the bolt extension guides into an upright operational position at each end of the first component unit 14. FIGS. (3 and 4) show the bolt extension guides 10 after being pressed upright into a vertical position at bending points 28, indicated by lead lines with arrows. In this position the bolt extension guides 10 are operational and ready for the bolt 22 to be inserted into each bolt extension guide hole 12. The bolt extension guides 10 are located on each end of the rectangular shaped first component unit 14. FIG. 4 illustrates an end view of the bolt extension guide 10 with the bolt 22 in place. FIG. 1 illustrates the improved extension locks 16 being located on the right side of the first component unit 14 looking down from a top view. The extension locks 16 FIG. 3 having keeper pin holes 26 on the outside edge for the use of keeper pins 24 or pad locks (not shown) for added security. The extension locks 16 are specifically positioned one on the right side and one on the left side of a center line located in the middle of the rectangular base of the first component unit 14. Lead lines with arrows 30 indicate bending points. FIG. 3 shows a perspective (bottom) view of the extension locks 16 on a completed door and gate latch.

Another embodiment in FIGS. 3,6 with a perspective view from the bottom of the door and gate latch shows the improved horseshoe shaped handle 20 above the left extension lock 16 in alignment with the elongated interlocking slot 18 near the base 42 of the horseshoe shaped handle 20. FIGS. (2, 3 and 6) discloses another preferred embodiment comprising the second component unit of the present invention. In combination the horseshoe shaped handle 20 is affixed (welded) at specific points to a elongated bolt 22. For clarity the horseshoe shaped handle 20 is shown in FIG. 6 before being affixed to the bolt 22. However, before welding the horseshoe shaped handle 20 to the bolt 22, it should be inserted through the bolt extension guide holes 12 illustrated in FIGS. (1, 2 and 4). After the bolt has been inserted into both bolt extension guide holes 12 the horseshoe shaped handle 20 is affixed to the bolt 22 by aligning the center point of the bolt 22 with the center point at the base 42 of the horseshoe shaped handle 20.

The 3" wide base of the horseshoe shaped handle allows for a 1.5" overlap on each side of the center point on the bolt. This affixed overlap from the center point provides a substantially large enough exposed surface mass for absorbing the energy from the operational forces applied at the handle. The transfer of energy from the wide base of the handle to the bolt provides an easy smooth unitized operational movement.

A further embodiment, of the present invention is disclosed in FIGS. (5, 7 and 8). In FIG. 5 a top view of the first keeper 36 shows a rectangular shaped piece of steel with a raised cylindrical like aperture in the middle. The aperture will receive and/or engage the end of the bolt 22 at each end of the door and gate latch illustrated in FIGS. (7 and 8). This keeper 36 in FIG. 5 has four elongated square carriage bolt slots 34 for the use of carriage bolts to mount the keeper on fence posts or doorjambs. The elongated carriage bolt slots 34 further provides a means to adjust the keeper 36 for realignment with the bolt 22 and keeper 36 FIG. 5 and keeper 48 FIGS. 9, 10.

Figure 9:
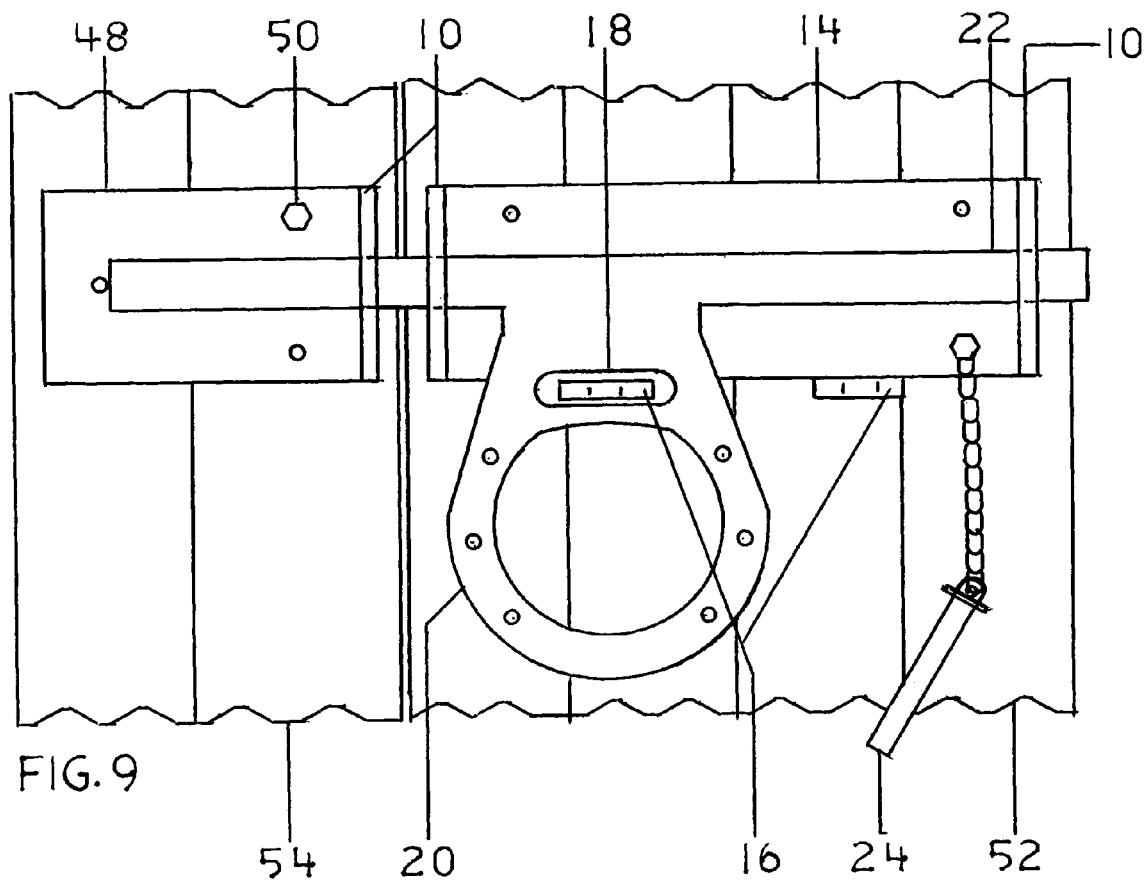
FIG. 9 illustrates a keeper with the bolt of the door and gate latch fully engaged. This keeper is designed to match the profile of the door and gate latch.
Figure 10:
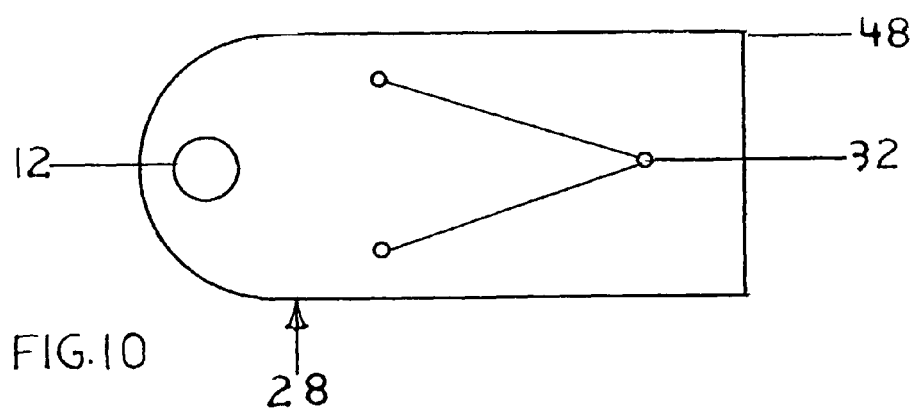
FIG. 10 illustrates the keeper shown in FIG. 9 in a flat profile with the bolt extension guide not being press upright into a operational position.

A further embodiment, of the invention is disclosed in FIGS. 9 and 10. The matching keeper 48 consisting of a rectangular piece of cold role steel, square at one end and round on the other end. The round end having a bolt extension guide hole 12 and a bending point 28 indicated by lead lines with an arrow for being pressed upright into a bolt extension guide 10 illustrated in FIG. 9 48. Three drilled mounting bolt holes 32 FIG. 10 for mounting the keeper 48 on a post, or doorjamb 52 FIG. 9 or on out buildings 54 FIG. 9.

Another embodiment of the present invention is disclosed in FIG. 6 for use on the horseshoe shaped handle 20. Wherein, small luminous cups 38 filled with a phosphorescent material are seated into small drilled holes 40 three on each side of the horse shoe shaped handle 20.

Operation—7,8,9, and 10

Figure 7:
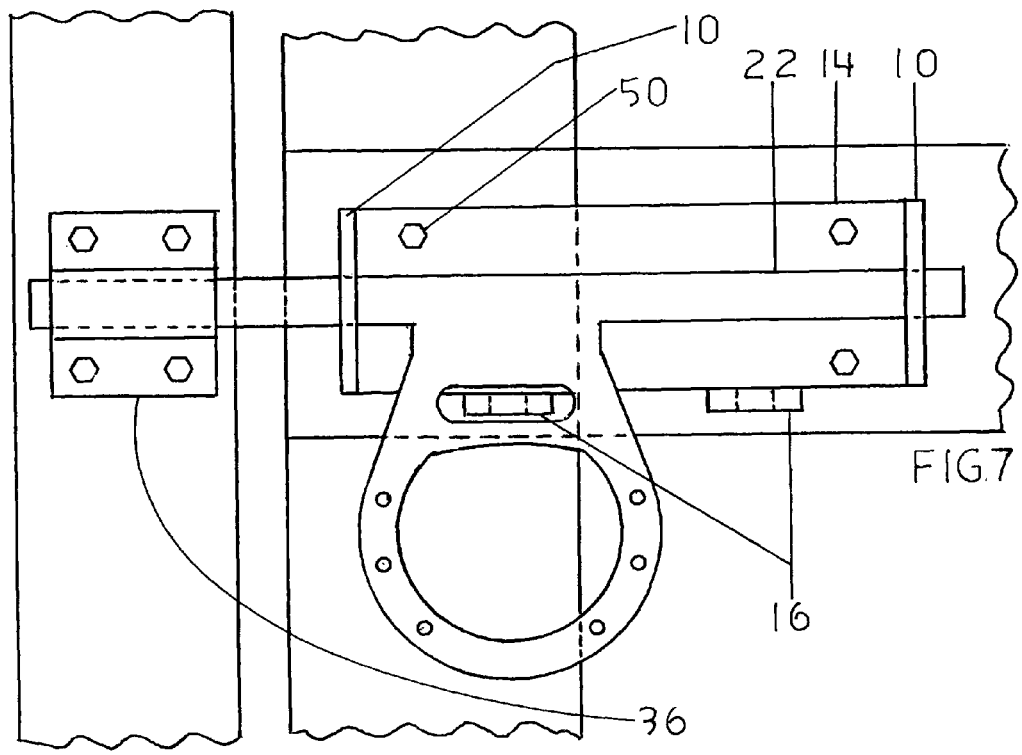
FIG. 7 illustrates the door and gate latch mounted on the left side of the gate in a closed position with the bolt fully engaged with the keeper. The horseshoe shaped handle is down over the left extension lock in the latched position. This gate will swing to the right when being opened.
Figure 8:
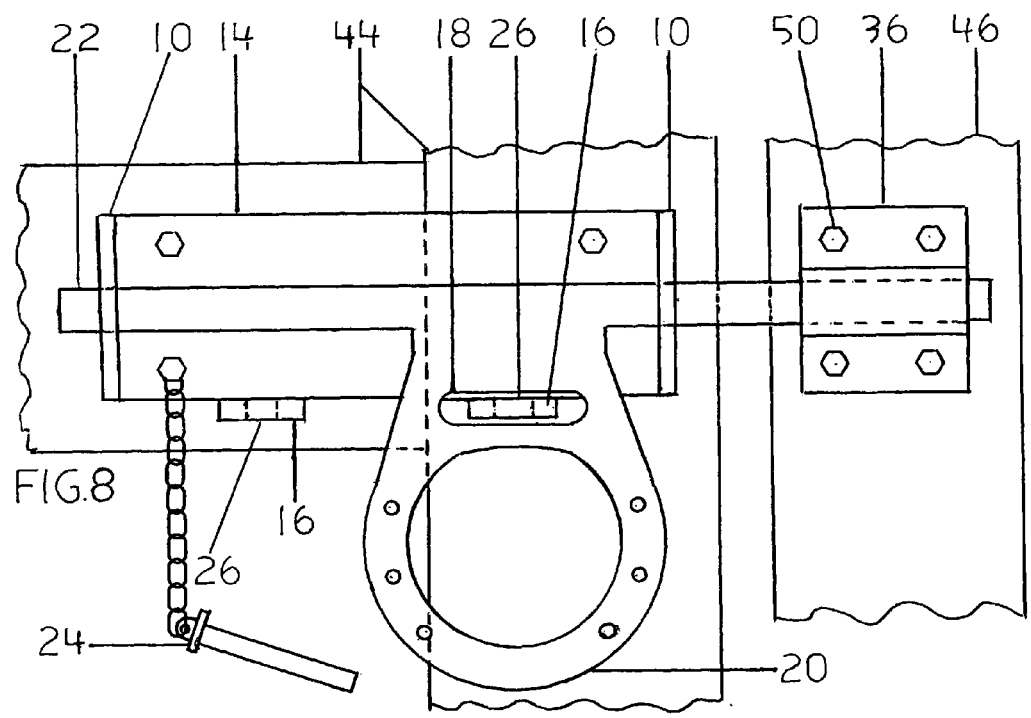
FIG. 8 illustrates the gate and door latch mounted on the right side of the gate in a closed position with the bolt fully engaged with the keeper. The horseshoe shaped handle is down over the extension lock in the latched position. This gate will swing to the left when being opened.

Operation of the door and gate latch begins with the illustrations in FIGS. (7 and 8). FIG. 7 is an illustration of a door and gate latch mounted on the left side of a gate 44. In FIG. 8 the door and gate latch is mounted on the right side of the gate 44. The door and gate latch is mounted to the gates by placing bolts 50 through the four mounting bolt holes 32 illustrated in FIG. 1. Illustrations in FIGS. (7 and 8) show both gates 44 in a closed position with the horseshoe shaped handle 20 rotated down over the extension locks in a latched position securing the bolt 22 in an engaged position with the keeper 36 mounted on a fence post 46. Having two extension locks 16 specifically positioned on the door and gate latch provides a reversible means for use on gates 44 that swing to the left or right when being opened. Operation of the door and gate latch illustrated in FIGS. (7 and 8) begins when it is necessary to close and open doors 52 or gates 44. To open the gate 44 in FIG. 7 the horseshoe shaped handle 20 with an elongated interlocking slot 18 is rotated upwards off the extension lock 16. The horseshoe shaped handle 20 is then moved to the right until contact is made with the bolt extension guide 10 on the right or opposite side of the first component unit, stopping the movement of the bolt 14. The horseshoe shaped handle 20 is rotated down over the extension lock 16 in a secured out of the way location while the gate is open. Once again for clarity, the bolt extension guides 10 provide a means to control a rotating and measured left and right movement of the bolt 22 and affixed horseshoe shaped handle 20. Wherein, as explained in FIG. 7 above when moving the horseshoe shaped handle 20 to the right and it is stopped by the extension guide 10 it can be rotated down over the unused extension lock 16 on the right side of the door and gate latch for out of the way storage. At this point the gate 44 in FIG. 7 can be swung to the right and secured in an open position. To close the gate 44 it is swung back to a closed position aligning the bolt 22 with the keeper 36 which is mounted on the fence post 46. At this point the horseshoe shaped handle 20 is moved to the left into a full engagement position with the keeper 36 or 48 and rotated downward over the extension lock 16 in a latched position securing the bolt 22 in an engaged position in the keeper 36 or 48. When opening the gate 44 illustrated in FIG. 8 it will swing to the left in an opposite direction from the gate illustrated in FIG. 7. However, the operational procedures will be exactly the same when opening or closing either one of the gates 44. The only difference being, the door and gate latch illustrated in FIG. 8 is located on the right or opposite end of the gate 44 from the latch illustrated in FIG. 7. Therefore, when the horseshoe shaped handle 22 affixed to the bolt is rotated upwards of the extension lock 16 it will be moved to the left where as it was moved to the right in FIG. 7 above.

Two embodiments of the present invention are disclosed in FIGS. (5, 7 9 and 10) these specifically designed keepers 36 and 48 provide the consumer a choice for selecting the keeper that will best fit their individual needs. The first keeper 36 illustrated in FIG. 7 is primarily for use on gates 44 that confine medium and large sized animals to stales in barns or in barn yards and pastures and can be viewed in greater detail in FIG. 5.

The second keeper 48 illustrated in FIGS. (9 and 10) is an embodiment designed primarily with a cosmetically matching profile for use with the door and gate latch. This keeper will be utilized in log or post and beam homes, as dead bolts and used with door and gate latches placed on storage sheds and other outbuildings 52 around homes and will work in many other applications as well. When installed on fence post or doorjambs for operational use with the door and gate latch the keeper provides a aperture for engagement or disengagement with the bolt 22 of the door and gate latch.

FIGS. 1-10 Additional Embodiments

An embodiment of the present invention is disclosed in FIGS. (3 and 4). The bolt extension guides 10 are located on each end of the first component unit 14 in an upright operational position. They support the elongated bolt 22 and provide a stabilized control for a rotating left and right movement of the bolt 22. The bolt extension guides 10 further provide a means for stopping the left and right movement of the bolt 22. The horseshoe shaped handle 20 after being affixed to the bolt 22 is permanently fixed between the two extension guides 10 and when being moved left or right for a specific distance will stop when coming in contact with either of the extension guides.

Another embodiment of the present invention is disclosed in FIGS. (2 and 3). The bolt 22 being ⅝" in diameter and 13" in length is positioned in the bolt extension guide holes 12, wherein the horse shoe shaped handle when affixed to the bolt will be between the bolt extension guides 10. The bolt 22 is a key embodiment providing unrecognized operational features for the door and gate latch. Wherein, the bolt 22 is the pivotal element that hinges and combines the first component unit 14 with the second component unit 20 and 22. When the horseshoe shaped handle 20 is affixed to the bolt 22 the door and gate latch is operational. The bolt 22 is the element that engages and disengages with the keepers 36 and 48 to close and open doors 52 and gates 44. When the bolt 22 is engaged with the keepers 36 and 48 it is a point of security concern.

Another embodiment, of the present invention, the horseshoe shaped handle 20 affixed to the bolt 22 is disclosed in FIGS. (2, 3, 6 and 7). The size and profile of the horseshoe shaped handle 20 provides a means for grasping the handle with the whole hand. Wherein, introducing a leverage advantage for a smooth controlled operational ease. For clarity the horseshoe shaped handle 20 in FIG. 6 illustrates the elongated slot 18 that provides the means for interlocking the horseshoe shaped handle 20 with the extension locks 16. When the horseshoe shaped handle 20 is rotated down over the extension locks 16 in FIG. 7 the bolt 20 is fully engaged with the keeper 36 or 48.

A further embodiment of the horseshoe shaped handle 20 provides a means with a method for locating the door and gate latch during hours of darkness. Wherein, luminous cups 38 containing a phosphorescent material, are seated into six drilled holes 40, three on each side of the horseshoe shaped handle 20. The luminous cups 38 are filled with a phosphor sulfide material activated with copper that produces a phosphorescent glow providing light to locate the door and gate latch during the hours of darkness.

Another embodiment of the present invention is disclosed in FIGS. (3, 7 and 8). The extension locks 16 FIG. 3 are positioned at a specific point left and right of a center point on the rectangular base of the first component unit 14. The extension locks 16 provide a means to keep the horseshoe shaped handle 20 in a latched position when it is rotated down over the extension locks 16 while the gate is closed. Wherein, the bolt 22 is secured in a engaged position with the keeper 36 as illustrated in FIGS. (7 and 8). The extension locks 16 further provide a means to secure the horseshoe shaped handle 20 in a storage position when the gate is open. Wherein, the horseshoe shaped handle 20 can be rotated down over the unused extension lock on the opposite end of the gate, out of the way.

Another embodiment the extension locks 16 provides is a means to use the improved door and gate latch on either end of a gate illustrated in FIGS. (7 and 8). This is referred to as a reversed capability feature in the art. FIG. 7 illustrates when a door and gate latch is positioned on the left side of the gate 44 it swings to the right when being opened. FIG. 8 illustrates the latch positioned on the right side of a gate 44 that will swing to the left when opened.

FIGS. 3,6 Alternative Embodiments

An alternate embodiment of the present invention is disclosed in FIG. 6. Wherein, the emplacement means of six small round holes for the luminous cups, 38 to be pressed into, three on each side of the horseshoe shaped handle 20.

A embodiment providing added security and unwanted entry through a door FIG. 9 52 or gate 46 is disclosed in the keeper pin holes 26 illustrated in FIG. 3. They are located near the outside edge of the extension locks 16 for emplacement of keeper pins 24 or padlocks (not shown). Keeper pins 24 provide a higher degree of security and pad locks help prevent unwanted entry.

A further embodiment of the horseshoe shaped handle 20 is the interlocking slot 18 located near the base 42 of the handle. The interlocking slot 18 provides a means for the horseshoe shaped handle to interlock with the extension locks wherein, securing the horseshoe shaped handle 20 in a latched position.

ADVANTAGES

From the description above, a number of advantages of my improved gate and door latch become evident:

Provides a stable and dependable means for installation on doors and gates.
Simplicity introduces economical viability in the fabrication process.
Simple and dependable operational features introduce improvements in the art.
No enclosed parts, introduces a maintenance improvement in the art.
Provides improved flexible utilization for a wide range of consumer needs.
Provides a improved method for locating the door and gate latch during the hours of darkness.
Provides two simple units with all operational parts comprising only two pieces of steel.
Provides improved fabrication methods increasing production output.
Provides a door and gate latch that will secure medium and large animals.
Provides a door and gate latch with no screws, nuts or bolts, springs and only one weld.

CONCLUSIONS, RAMIFICATIONS AND SCOPE

Thus the reader will see that the door and gate latch of the above invention provides a highly reliable device with economical viability. The door and gate latch can be used in a wide range of applications on doors and gates for confining medium and large sized animals to pastures, barn yards and barns with stales. It further can be used inside homes, or outside homes on storage buildings, for home driveway gates and yard gates. Furthermore, the door and gate latch has additional improved advantages in that:

it has two simple component units that are easily combined by sliding the bolt through both bolt extension guides and affixing (welding) the horseshoe shaped handle at a specific point on the bolt;

it provides a latch animals cannot accidentally disengage;

it provides a lifetime of trouble free service through simple easy to operate structural design;

no enclosed sensitive parts that create unnecessary problems everything can be observed and the improved latch cleans itself through the process of being operated;

it is a reversible latch that can be placed on either end of a gate for use on gates that swing left of right when being opened;

it introduces a highly improved horseshoe shaped handle that can be grasped with the whole hand wherein, providing a leverage means to operate the door and gate latch under the worst adverse weather conditions;

the door and gate latch further provides an improved means for locating the door and gate latch during the hours of darkness;

it introduces none tubular bolt guides freeing the movement of the bolt from restrictive forces that build up in the enclosed area around the bolt;

it can be produced in a variety of colors with high quality powder coating techniques that further expands the wide range for a recognized consumer need;

it has no nuts and bolts, screws, spot welds or springs; all functioning interrelated parts, except the horseshoe handle and elongated bolt are contained in the first component unit as one piece cut from flat steel plating with a plasma cutter; all functional parts are pressed upright into operational position; the horseshoe shaped handle is also cut out on the plasma cutter, the bolt being the only element not produced with the plasma cutter; the latch becomes operational when the bolt is placed through the bolt extension guide holes and the horseshoe shaped handle affixed (welded) to it;

it offers three stages of security, the first stage being when the horseshoe handle is rotated down over the extension lock where it is secured in a latched position; the second stage can be utilized if problems require the use of a keeper pin being placed into the keeper pin holes or a pad lock can be used in the third stage providing security for unwanted entry;

it provides a extended bolt and open ended keeper features that permits adjustment for fence post and gate separation;

it provides a means for improved solid attachment to doors and gates; wherein, the four drilled mounting bolt holes on the base of the first component unit are dispersed enough to cover a surface area that will support the imposed stress forces from every day use;

Although the description above contains many specifications they should not be construed as limiting the scope of the invention but as merely providing illustrations of some of the presently preferred embodiments of this invention. Many other variations are possible. For example, the door and gate latch can have other shapes, the first component unit could be square, oval, triangular, circular or any imaginable functional shape. The bolt could be square, triangular or oval with bearing hubs in the bolt extension guide holes to fit the different shaped bolts. The horseshoe shaped handle could be oval, circular, triangular, or a T shaped device and a plurality of decorative devices could be framed inside the horseshoe shaped handle. The door and gate latch could be made of cast iron, brass, bronze, copper, plastic, aluminum or many mixed combinations thereof. The door and gate latch could have many different colors, or could be fabricated in many different sizes, and have many variations for profiled configurations.

Thus the scope of the invention should be determined by the appended claims and their legal equivalents, rather than by the examples given.

I claim:

1. A latch assembly for securing a door or gate to a doorframe or gate post, comprising:
   a keeper mounted to one of the door or gate and the doorframe or gate post;
   a latch mounted to the other of the door or gate and the doorframe or gate post, the latch comprising:
      a base member having mounting means;
      first and second extension guides, each extending upwardly from the ends of the base member and having a guide hole;
      first and second extension locks, each extending from one side of the base member and having a lock hole;
      a sliding bolt received within the guide holes to move between a latch position, secured to the keeper and an unlatch position away from the keeper and allowing the door or gate to move;
      a handle member comprising:
         a handle base having a first portion with one side attached to the sliding bolt and a wide tapering portion extending away from the opposite side of the handle base, the wide tapering portion defining an elongated slot therein adapted to receive a respective extension lock;
         a horseshoe shaped grip member having one end attached to the wide tapering portion and an opposite grip portion;
         the handle base and the wide tapering portion being sized and shaped so as to provide the grip portion closed to the sliding bolt to assure a smooth sliding movement of the sliding bolt;
      wherein, when the sliding bolt is secured to the keeper, the elongated slot receives the extension lock closed to the keeper, maintaining the sliding bolt in the latched position;
      upward rotation of the handle member in the latched position allows the elongated slot to be free from the extension lock, in this position, movement of the handle member away from the keeper will move the sliding bolt toward the unlatch position, the handle member is then rotated down so that the elongated slot can engage the other extension lock and secure the handle member in the unlatch position.

2. The latch assembly according to claim 1, wherein each extension lock has a top surface an lateral tapering surfaces extending from each side of the op surface to allow the insertion of the elongated slot.

3. The latch assembly according to claim 1, wherein each lock hole is capable of receiving a lock member to lock the handle member in each position of the sliding bolt.

4. The latch assembly according to claim 1, wherein each extension guide stop further movement of the sliding bolt when is moved between the latch and unlatch position.

* * * * *